Aug. 22, 1967  S. A. BONZI  3,336,823
PRECISION ROTARY WORK TABLE
Original Filed May 18, 1965  6 Sheets-Sheet 1

INVENTOR.
Stephen A. Bonzi
BY
*J. P. Moran*
ATTORNEY

Aug. 22, 1967  S. A. BONZI  3,336,823
PRECISION ROTARY WORK TABLE
Original Filed May 18, 1965  6 Sheets-Sheet 2

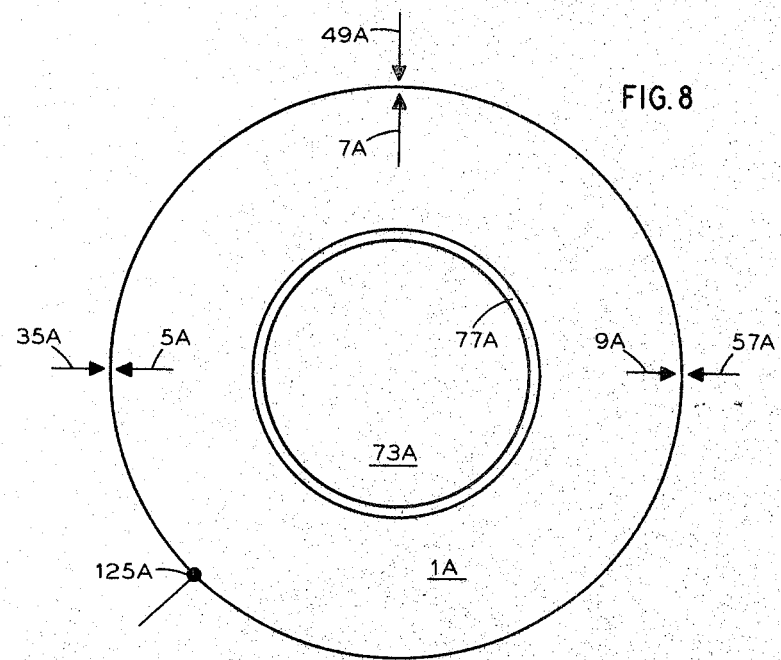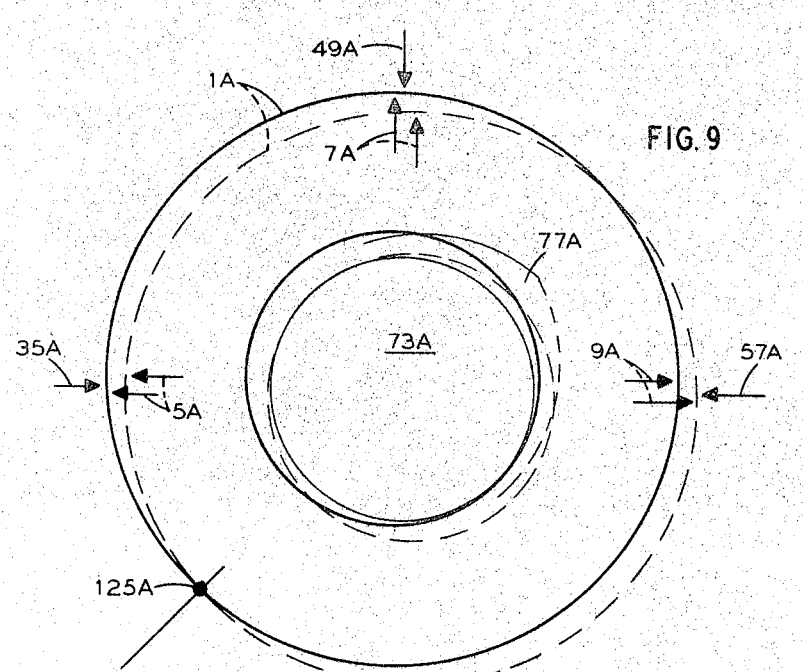

United States Patent Office 3,336,823
Patented Aug. 22, 1967

3,336,823
PRECISION ROTARY WORK TABLE
Stephen A. Bonzi, Rockford, Ill., assignor to The Babcock & Wilcox Company, New York, N.Y., a corporation of New Jersey
Continuation of application Ser. No. 456,788, May 18, 1965. This application Sept. 28, 1966, Ser. No. 582,764
7 Claims. (Cl. 77—64)

This application is a continuation of application Ser. No. 456,788, filed May 18, 1965.

The present invention relates to machine tools, and more particularly to improvements in machine tools utilizing a rotary table to accurately position a work-piece successively in a plurality of working stations.

The machine tool industry has continually endeavored to improve the accuracy and reproducibility of its products. Over the years such endeavors have necessitated the expenditures of large amounts of time and money with seemingly small incremental improvements which, however, have frequently and significantly advanced the state of the art.

In the present invention I provide an improved construction and arrangement of a rotary indexing table for accurately aligning a work-piece with successive working stations so that the exactness of reproducing the machine operations can be relied upon. This involves improved exactness of alignment between working stations and work-pieces and is accomplished by use of a locking and aligning device which locates the center of the work table in an identical position after rotation of the indexing table to successive work positions.

The various features of novelty which characterize my invention are pointed out with particularity in the claims annexed to and forming a part of this specification. For a better understanding of the invention, its operating advantages and specific objects attained by its use, reference should be had to the accompanying drawings and descriptive matter in which I have illustrated and described a preferred embodiment of the invention.

FIGS. 8, 9, 10, and 11 are schematic diagrams illustrating the operations of a rotary work table of the type illustrated in FIGS. 1–7, inclusive.

Figure 1:
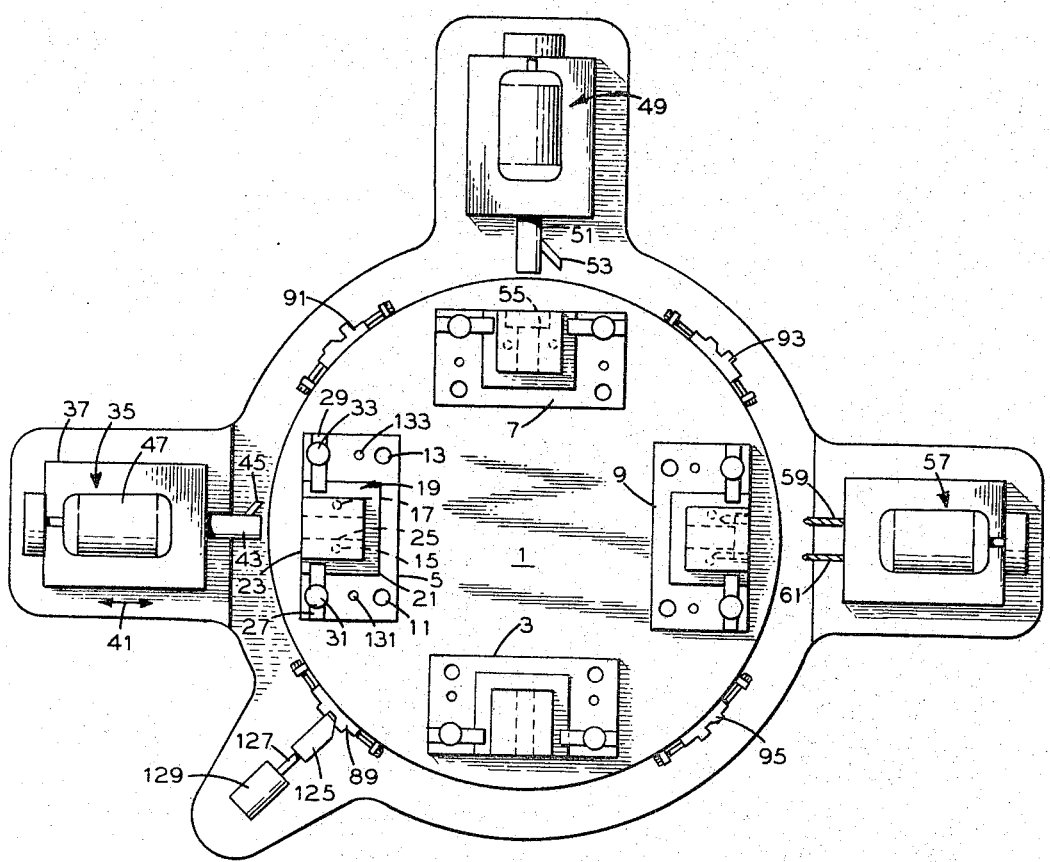
FIG. 1 shows a plan view of a rotary indexing work holding table constructed and arranged according to the present invention.

FIG. 1 shows a plan view of such a machine built in accord with best practice prior to the invention which is to be described later. This prior art machine will be described in detail for two reasons. First, general construction is the same as the machine incorporating the invenvention. Second, a clear understanding of the older design is required to appreciate the significance of the improvement provided by the invention.

In FIGURE 1, numeral 1 designates a round table or disc made of metal such as cast-iron. Mounted on table 1 is a plurality (in this case, four) of work holding devices or "fixtures," 3, 5, 7, and 9. For simplicity in the present example, these fixtures are shown as flat plates. In a given actual case, the fixtures might be rather complex assemblies suitable to hold securely a particular work piece.

Figure 2:
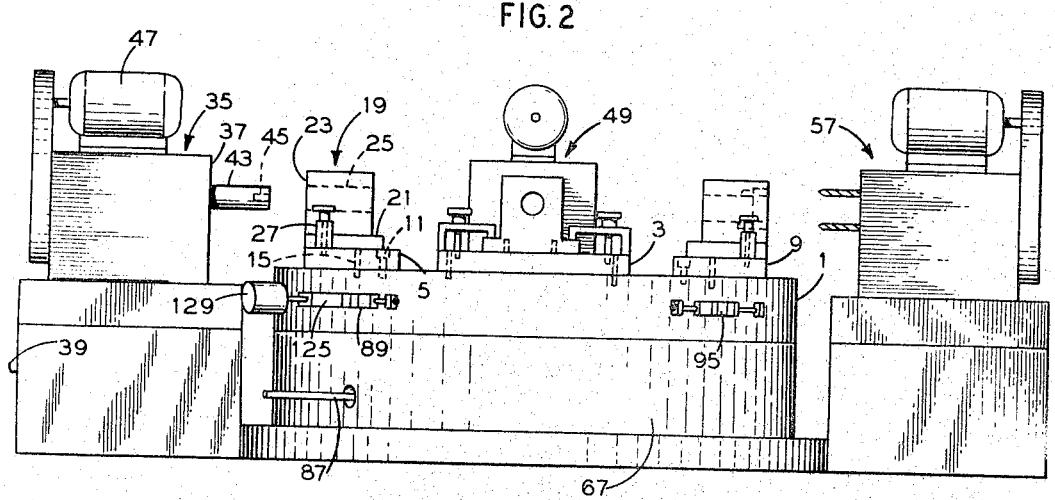
FIG. 2 is an elevation of the machine shown in FIG. 1.

Fixture 5 will be described as typical of all four fixtures. Referring to FIGS. 1 and 2, fixture 5 is secured to table 1 by means of machine screws 11 and 13. These screws are received by threaded holes in the top of table 1. As will appear presently, the exact locations of the fixtures on the table are critical to accurate manufacture of work-pieces. In the fabrication of table 1, the threaded holes for holding screws 11 and 13 are located as nearly accurately as practical. However, possibility of slight adjustment of the location of fixture 5 is provided by making the mating holes in fixtures 5 slight larger than the screws. The process of final fixture location will be discussed further below.

Figure 2A:
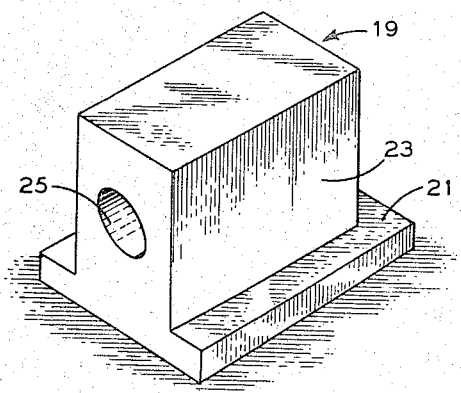
FIG. 2A is an illustration of a work-piece susceptible to machine operations in the machine of FIGS. 1 and 2.

Fitted securely into holes in fixture plate 5 are two dowel pins 15 and 17 which project above the top surface of the plate and are rounded or tapered at their upper ends. These pins are accurately located in the plate 5 so as to mate with locating holes previously machined in the bottom of work-piece 19 such as shown in FIG. 2A. The particular work-piece shown as an example has a flange 21 around three sides at the bottom. The work-piece also includes an upstanding main portion 23 in which is a pre-cast or "cored" hole 25. It should be noted that all work-pieces on the machine are alike. This is because the machine described is a "special" or "production" machine designed to perform successive operations on identical parts in course of manufacture.

At 27 and 29 are shown two "toe clamps" used for securing the workpiece to the fixture. The toe clamps are arranged to engage the flange 21 of the work-piece and hold it down on the plate 5. The toe clamps are tightened by hand screws 31 and 33 which pass through the clamps and are threaded into plate 5. The coresponding toe clamps for fixture 3 show the construction more clearly in FIG. 2.

A work-piece to be machined is loaded by the operator into a fixture when it is in the location occupied by fixture 3 in FIG. 1.

A previously loaded work-piece 19 is in fixture 5. Opposite adjacent fixture 5 is a metal cutting work unit indicated generally by numeral 35. Unit 35 may be any of a great variety of working units well known in the machine tool art and need not be described in detail here. As one example, unit 35 may be a structure such as described in U.S. Patent No. 2,266,829. For present purposes, it is sufficient to point out that the body 37 of unit 35 is slidably mounted on a base 39. Power means not shown are provided for propelling the body in a to-and-fro manner along its base as indicated by the double headed arrow 41 in FIG. 1. In the present example, unit 35 also includes a spindle or bar 43 which is rotatable about its longitudinal axis and is equipped with a boring tool or bit 45. An electric motor 47 provides power for rotating the bar 43. Power is transmitted from motor 47 to bar 43 through belts, gears or other transmission means not shown.

By control means not shown, the operator may cause the unit 35 to approach the work-piece 19. Typically, unit 35 will first approach the work at a relatively fast rate commonly referred to as "traverse rate." Just before the tool 45 makes contact with the work-piece, the rate of approach may be automatically slowed to a "feed rate" suitable for performing a boring cut in the material of work-piece 19. As forward progress of unit 35 continues, tool 45 generates a cylindrical hole which is an enlargement of the pre-cast hole 25. This boring operation improves the inside finish of the pre-cast hole and produces the desired final diameter of that hole. Also, the boring operation can correct the location of the hole by removing more metal from one side than the other. That is to say, a pre-cast hole can, at best, be an approximation in finish, size and location. Subsequent boring is needed to provide the desired final condition of the hole. When the hole is completely bored, automatic means normally cause the unit 35 to withdraw to its original retracted position shown in FIGS. 1 and 2.

A working unit 49 similar to unit 35 is placed in working relation to fixture 7. Unit 49 has a bar 51 and a tool 53. In this example, tool 53 is set to generate a somewhat larger diameter than tool 45. Unit 49 performs a cyclic operation similar to that of unit 35 except that it does not advance as far into the work-piece in its forward motion. The purpose of unit 49 is to generate a counterbore 55 which is concentric with the original hole but of lesser depth.

Opposite fixture 9 is a third working unit 57 which is generally similar to units 35 and 49 but which carries two rotating twist drills 59 and 61. These drills generate holes in the work-piece which are in a desired spatial relation to the main hole previously discussed.

Ordinarily units 35, 49, and 57 have their described working functions initiated simultaneously and all will finish at about the same time. Although the units cycle simultaneously, their respective functions constitute successive operations in so far as a given work-piece is concerned. At the conclusion of one cycle of all working units, table 1 is rotated ninety degrees clockwise about its central vertical axis. By this rotation or "indexing" motion, a new piece is carried by fixture 3 to position opposite unit 35; the through-bored piece is carried by fixture 5 to position opposite unit 49; the counter-bored piece is carried by fixture 7, into position for drilling by unit 57 and a finished piece is carried by fixture 9, to the operator's station for unloading and replacement by a new unmachined piece. Thus the process continues cycle after cycle.

In describing the function of the working unit 35, it was mentioned that the bore created must be accurately positioned. This means its center line must be at prescribed dimensions relative to the bottom surface of the work-piece and relative to the locating dowel holes in that bottom surface. Since the work-piece is attached to the fixture and the locating dowels are in the fixture, this means that a fixture must be accurately located relative to unit 35 when the boring is being done. Again, the counter-boring must be accurately concentric to the main bore. This requires that indexing of a fixture from unit 35 to unit 49 must result in accurate relation between a fixture and unit 49. The same condition applies to the index to unit 57 since the drilled holes are required to be in accurate relation to the main bore.

The preceding paragraph clearly emphasizes that a great many dimensions must be held to close tolerances in the construction of this machine. Of course, the exact tolerances permissable on all these dimensions will depend upon the quality of pieces being machined. However, in any meaningful case, the tolerances will vary only between a few thousandths of an inch and, perhaps, a fraction of a thousandth in some cases. In other words, the invention relates to high grade machine shop practice.

Prominent among important dimensions are: Angular spacing from one work unit to the next; both angular and linear locations of the fixtures on the table and the precision of moving the table during each index. Of these critical dimensional quantities, the last is the one with which the present invention is concerned. Generally, in the discussion to follow all dimensions will be considered perfect except those having to do with accuracy of table rotation( index error). It is understood, of course, that other errors can void the usefulness of the machine as a whole. However, correction of these other errors involves skill and procedures apart from the subject matter of the invention.

Figure 3:
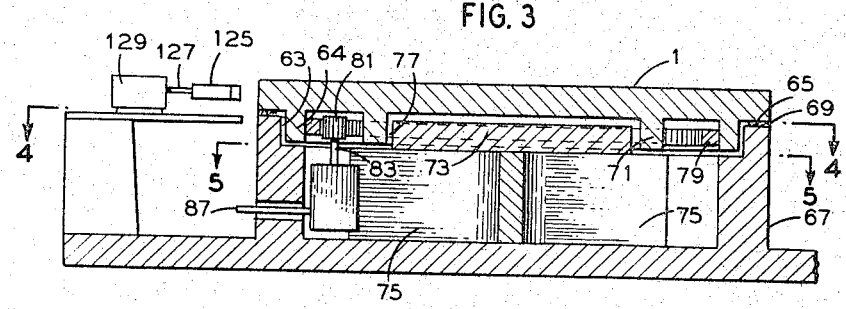
FIG. 3 is a section taken on line 3—3 of FIG. 4.

In FIG. 3, table 1 is seen to have a flat top and a thickness of solid metal sufficient to support the fixtures and work-pieces. On the underside, the original depth of the table material has been machined away for several purposes now to be described.

Figure 4:
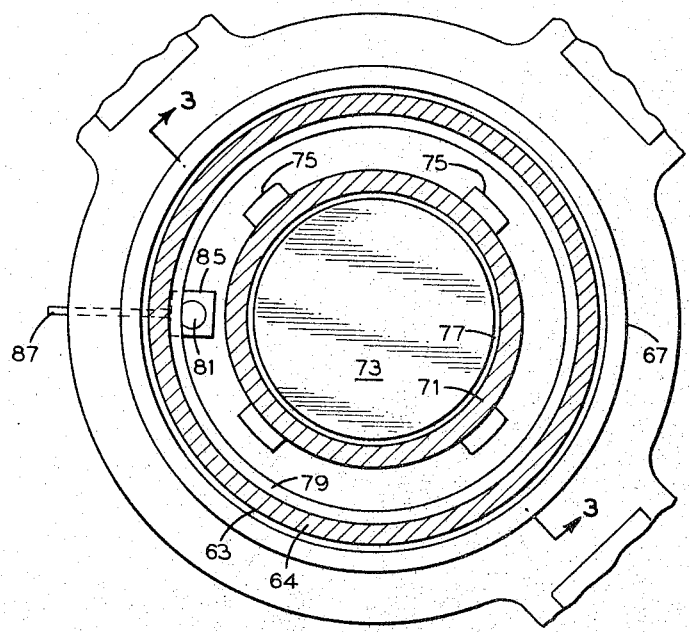
FIG. 4 is a section taken along line 4—4 of FIG. 3.

Numeral 63 in FIGS. 3 and 4 designates the outer diameter of a circular downward ring-like extension 64 of table 1. Turning away metal to form the surface 63 leaves a peripheral flange surface 65. Flange 65 rests on top of the cylindrical base 67. The base 67 is usually made of cast iron or steel. Because the table is also of iron or steel, it is desirable to have a ring 69 of bronze or other suitable non-ferrous bearing material attached to the top of base 67 and providing a relatively low friction bearing on which the table 1 rotates.

While the bearing ring 69 carries the weight of table 1 it is also necessary to provide radial or centering location for the table rotation. For this purpose, a circular downward ring-like extension 71 of the table is provided. The inner diameter of the extension 71 is turned as near truly circular as practical. Mating with the inner surface of 71 is a stationary disc 73. Disc 73 is the inner or journal portion of the table radial bearing. The outer diameter disc 73 must be turned as truly circular as practical.

Figure 5:
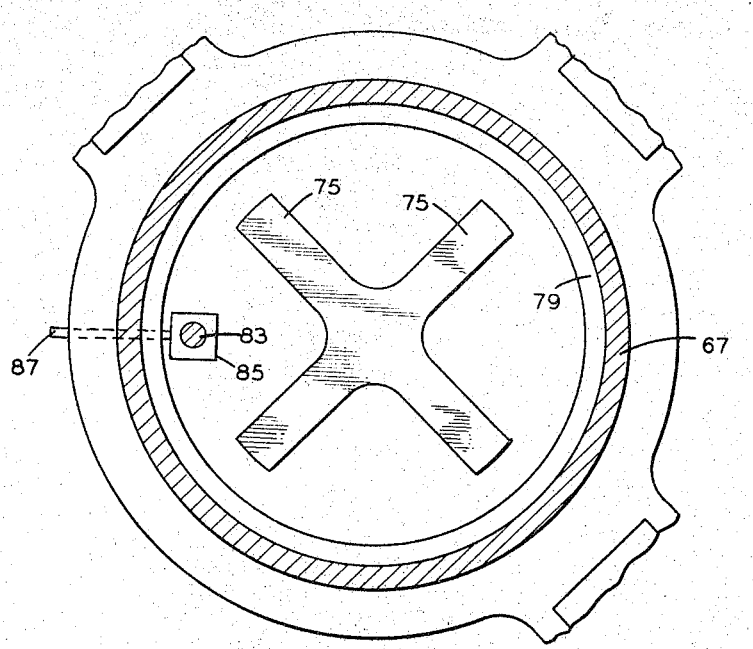
FIG. 5 is a section taken along line 5—5 of FIG. 3.

As seen in FIGS 3, 4 and 5, disc 73 is fixed upon the crossed structural members 75 which are integral with base 67.

Shown in FIGS. 3 and 4 is a clearance 77 between disc 73 and the ring 71. This clearance is shown exaggerated in the drawing but it must be on the order of some thousandths of an inch to prevent binding of radial bearing.

For purposes of causing rotation of the table, an internal ring gear 79 is fixed to the inner surface of the ring 64. Meshing with this internal gear is a pinion gear 81 which is mounted on the output shaft 83 of gear box 85. The input shaft 87 to the gear box 85 extends through a clearance hole to the outside of base 67. Means for turning this input shaft may be of various descriptions such as: An electric motor, a hydraulic fluid motor, a geneva type mechanical drive or other. For present purposes the specific means for turning shaft 87 is immaterial. Suffice to say that power must be supplied to this shaft intermittently, during each index motion of the table.

In the example here discussed, it seems clear that the table must turn as nearly as possible to ninety degrees during each index. This statement is based on the fact that the counter-bore is to be concentric with the main bore and the drilled holes are to be in a predetermined relation to the main bore. In spite of the apparent certainty of the above statement, it is probably more useful to put it in a more general form. Thus, it may be said that each stopping place of the indexing table shall be such as to place each holding fixture in proper working relation to its adjacent working unit. This generalization takes care of the obvious cases where there is a different number of working stations. It also has a deeper significance which will appear later in discussing the novelty of the present invention.

Figure 6:
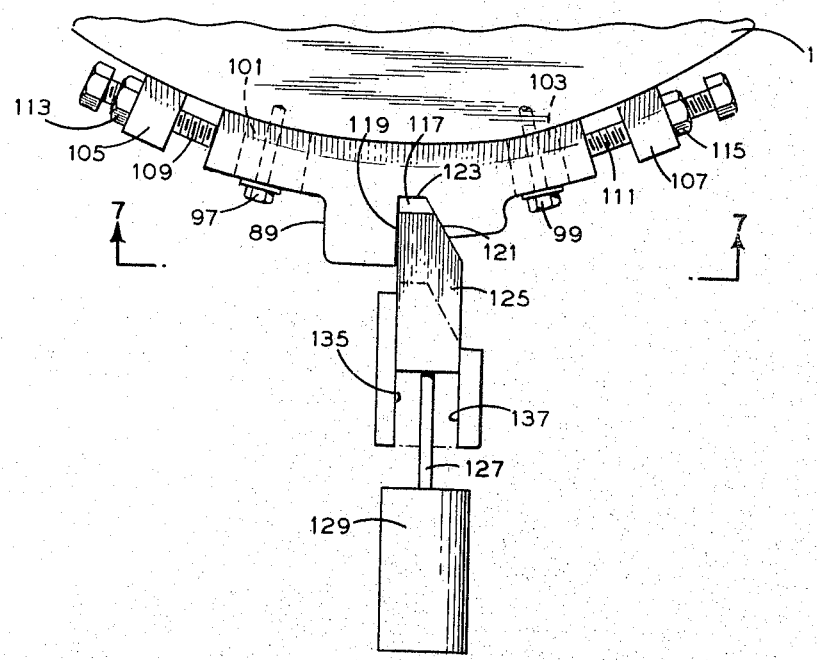
FIG. 6 is an enlarged plan view of a portion of the apparatus shown in FIG. 1.
Figure 7:
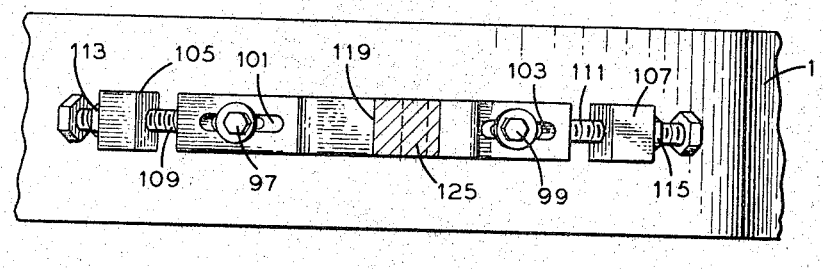
FIG. 7 is a view of the apparatus shown in FIG. 6.

In providing intermittent power to shaft 87, an effort is made to stop the actuation with the fixtures positioned in accord with the above requirement. As a practical matter, it has been universal experience that only an approximation to correct stopping positions can be provided by control of power application to shaft 87. An obvious (but only one of many) reason for this is the inevitable back-lash in gear box 85 between the gears 79 and 81. To assure more precise positioning of the table, a recess block (89, 91, 93, and 95) is provided for each table stopping position. The recess blocks are shown in their relative locations in FIG. 1. In FIGS. 6 and 7, recess block 89 is shown to a larger scale and in more detail.

As seen in FIGS. 1, 2, 6 and 7, block 89 has a concave surface to conform to the periphery of table 1. The block 89 is secured to table 1 by screws 97 and 99 which are screwed into tapped radial holes in the table. Screws 97 and 99 pass through slots 101 and 103 respectively in the block 89. These slots are wide enough to slip loosely over the bodies of the screws but are narrower than the diameter of the screw heads. Thus, with screws 97 and 99 loosened, block 89 may be slipped a limited distance along the periphery of the table. Tightening screws 97 and 99 provides frictional resistance to slipping of block 89 relative to the table.

Adjacent each end of block 89 is a projection (105, 107) attached to, or formed integral with, the table 1. The projections 105 and 107 are far enough apart to permit the aforementioned limited shifting of block 89. Threaded through projections 105 and 107 are adjusting screws 109 and 111, respectively. As seen in FIGS. 6 and 7, the screws 109 and 111 may be adjusted so as to abut the respective ends of block 89. With holding screws 97 and 99 loosened slightly, block 89 may be moved either way by backing off one of the adjusting screws 109 or 111 and advancing the other. Using relatively fine pitch adjusting screws, this adjustment can be quite precise. When block 89 is positioned as desired, it will be firmly clamped between the adjusting screws. To secure this adjustment against subsequent slipping, the holding screws 97 and 99 are firmly tightened. In addition, lock-nuts 113 and 115 are tightened against projections 105 and 107, respectively.

As seen most clearly in FIG. 6, block 89 has a special wedge shaped notch 117 machined in it facing outward from the center of the table. One surface 119 of this notch is carefully positioned in a vertical plane which also contains the axis of rotation of table 1 (see also FIG. 1). The opposite wedge surface 121 of notch 117 is also in a vertical plane but this plane is positioned at a substantial angle to the plane of surface 119. The surfaces 119 and 121 do not intersect physically but are separated by a bottom surface 123 of the notch. The exact location and orientation of surface 123 is not critical.

Complementary to notch 117 is a wedge shaped locating plunger 125. As shown in FIG. 6, plunger 125 comprises mutually inclined surfaces which mate as accurately as practical with surfaces 119 and 121 of the notch. The narrow end of plunger 125 is cut off to such a length that it does not reach the bottom of the notch when the wedge surfaces are in maximum contact.

Plunger 125 is joined by means of a rod 127 to the piston (not shown) in an hydraulic or pneumatic cylinder 129. Means for controlling and furnishing fluid power to cylinder 129 are conventional and are not shown and described. For present purposes, it is sufficient to note that the plunger 125 is forcefully seated in the notch 117 when the table is to be held stationary in working position. When the table is to be indexed or rotated to a new working position, the plunger 125 is withdrawn so that its narrow end completely clears block 89 (see dot-dash in FIG. 6).

Returning to FIG. 1, it is seen that only one plunger 125 is provided for engagement sequentially in all the locating blocks 89, 91, 93, and 95.

As previously noted, the timing of power application to shaft 87 results in only an approximation to a desired angular position of the table. One way of terminating indexing power is to provide a limit switch (not shown in the drawings) which cuts off power to shaft 87 and, perhaps, applies some sort of brake. Plunger 125 and its adjacent position block is depended upon to correct the table position.

Because there is considerable inertia to table 1 and its burden, the table will tend to overshoot when shaft 87 is stopped. Backlash in gearbox 85 and between the gears 79 and 81 allows the aforesaid tendency actually to have an effect and the table drifts somewhat beyond the stopping place dictated by the limit switch. Presence of the backlash and overshoot will permit the table to be rotated backward slightly without hinderance other than friction. Herein lies the function of the wedge shape of plunger 125 and the notches in blocks 89, 91, 93 and 95. This function will now be explained.

Referring to FIGS. 1 and 6, the side of plunger 125 which mates with surface 119 (call it the "radial side") is set up in a vertical plane which includes the center of rotation; that is, a vertical radial plane relative to the table. Now, assuming that the table has traveled slightly too much clockwise (FIG. 1), when plunger 125 is advanced toward the table, its radial side will not touch surface 119 at the beginning of entry into notch 117. As entry proceeds the opposite "wedge side" of plunger 125 will make contact with surface 121 of notch 117. Further advance of the plunger will exert a camming action on surface 121; forcing rotation of the table counterclockwise. This counterclockwise movement will continue until the surface 119 makes contact with the radial side of plunger 125. This contact will, of course stop further entry of the plunger and further rotation of the table.

It is to be noted that the contact of surface 119 with its complementary surface on the plunger is established in direction substantially normal to these surfaces. Thus, there is essentially no rubbing motion between them and, consequently, negligible wear. These facts make it possible to regard the previously defined radial surfaces as establishing an unvarying stop location. Wear on the camming surfaces merely causes the depth of entry of the plunger to vary.

Since the radial side of plunger 125 is the critical locating surface for table angle, it is necessary that this surface be precisely located angularly and not allowed to vary. This is accomplished by providing a rigid guiding surface 135 machined on a part integral with the table base (detail of construction not shown). Opposing this guide is an adjustable guiding surface 137 which opposes surface 135 and bears upon a portion of plunger 125 which is parallel to its radial surface 119. Wear along surface 135 is minimized by the fact that there is only a snug guiding fit maintained between 135 and 137; the severe force of cylinder 129 being taken by the camming surface 121 acting only normal to surface 119.

Having thus far described the general structure of the machine, it is now possible to describe a procedure for setting up and operating the machine. In this description, the assumption (subject to later qualification) will be made that the center of rotation of table 1 remains perfectly fixed. This implies that the clearance shown at 77 in FIGS. 3 and 4 (rotational bearing clearance) remains uniform around its full circumference. Actually, this assumption can be fairly realistic since the absolute magnitude of the clearance is only a few thousandths of an inch and there will be means for assuring the presence of lubricant to fill this clearance substantially full. The lubrication means are not shown. They can typically vary from a preapplication of a heavy grease to a pumping system to force oil continuously under pressure into the clearance. The interface between the flange 65 and nonferrous bearing ring 69 (FIG. 3) is also suitably lubricated.

Assuming, as aforesaid, a perfect center of table rotation, set-up procedure may start with machine parts disposed as shown in FIG. 1.

To provide a starting place, block 89 may be adjusted and locked at about the middle of its adjustment range. Since, as previously mentioned, fixture 5 has previously been fairly accurately located by means of screws 11 and 13 and since working unit 35 has been placed as nearly as practical to its correct location, there should be a very close approximation to an accurate working relationship between unit 35 and the work-piece 19 in fixture 5. Residual inaccuracies in the said working relationship can be corrected by one or a combination of several adjustments. If necessary, the unit 35 can be shifted since some form of position adjustment (not shown) will normally be provided in the unit mounting. More pertinent to the present description, fixture 5 can be shifted in any direction within the clearance provided by holding screws 11 and 13. If this clearance is not sufficient, the table may be rotated slightly, either way, by adjustment of the position of location block 89. When, with the best available measuring instruments, fixture 5 and unit 35 are found to be in accurate working relation, block 89 is locked tight and the screws 11 and 13 are tightened. To assure that fixture 5 will not thereafter shift under stress of cutting forces, dowel holes 131 and 133 are now drilled through the fixture plate and into the top of the table. The dowel holes are precisely reamed to accept hardened steel dowel pins ground externally to fit the reamed holes with a light drive fit. In some cases, the dowel holes may be reamed with a slight taper and tapered dowel pins are used.

With fixture 5 permanently positioned on the table and unit 35 finally located (probably also doweled), the table is indexed approximately ninety degrees clockwise. This brings fixture 5 into approximate working relation to unit 49 and fixture 3 to unit 35. Plunger 125 is inserted into the notch of block 95. It is now necessary to establish correct relation between fixture 5 and unit 49 and between fixture 3 and unit 35.

Since fixture 5 and unit 35 have previously been permanently located, the degrees of freedom for the present adjustment are less than before. Respecting fixture 5, it is possible to adjust the position of unit 49 and the position of block 95. Respecting fixture 3, the fixture itself can be shifted and block 95 can be adjusted. Since the position of block 95 affects both fixtures, it is necessary to work back and forth between the two in adjusting this block. Eventually, the relations are established, fixture 3 is doweled, unit 49 is doweled and block 95 is locked.

Now, the table is again indexed. Fixture 3 is at unit 49, fixture 5 is at unit 57 and fixture 9 is at unit 35 and block 93 is engaged by plunger 125. Since fixture 3 and unit 49 are both permanent, only the adjustment of block 93 is available to correct any misalignment of fixture 3 and unit 49. Therefore this block must be done first. Thereafter, fixture 9 is aligned to unit 35 and doweled and unit 57 is aligned to the permanently located fixture 5.

One more table index brings fixture 7 opposite unit 35. Block 91 must first be adjusted to bring fixture 3 to unit 57 and fixture 9 to unit 49. Then fixture 7 is positioned and doweled relative to unit 35.

All units, fixtures and location blocks should now line up correctly at all stopping positions. While the above procedure is technically correct, it is prudent to go through this whole procedure first without actually performing the dowelling operation. Instead, only the locating screws are tightened on the first time around. Then the indexes repeated several times and checked for repeatability. After any remaining discrepancies are corrected, the dowels are installed and the machine is ready for use.

A flaw in the prior art

In the above discussion, considerable stress was placed on assuming that the center of rotation of the table remains fixed. This assumption is necessary if it is to be concluded that all fixtures and work units will repeat their mutual relationships accurately each time plunger 125 enters a given one of the notched blocks 89, 91, 93, or 95. However, as a matter of fact, the assumption is not correct and so the conclusion is in error.

The axis of rotation cannot be assumed to be immovable because of the clearance 77 shown in FIGS. 3 and 4. Even though this clearance is substantially filled with lubricant, this lubricant is subject to displacement by lateral forces, leading to variance of the true center of rotation.

The use of roller or ball bearings in the (widened) space 77 does not cure the trouble. This is because all such bearings must be made with some "play" or clearance in order to run smoothly. In actual machine practice, a "plain bearing" can often be made to provide better center integrity than can be obtained with an antifriction bearing.

FIGURE 8 is a geometrical diagram derived from FIGS. 1 and 4. It is a simplification to show the essentials of the ensuing argument. In FIG. 8, the clearance 77A represents the clearance 77 of FIGS. 3 and 4 but somewhatmore exaggerated. Numeral 125A is analogous to the plunger 125 in FIG. 1 except that it is here shown simply as a fixed point on the periphery of table 1A. Opposing arrows 35A and 5A represent unit 35 and fixture 5, respectively. Each of the other working units and holding fixtures is similarly represented by an arrow. It is to be understood that exact colinear correspondence of two arrows represents accurate working alignment of the respective unit/fixture pair. In FIG. 8, the space 77A is uniform in width throughout its circumference so that table 1A is concentric with the stationary center post 73A. In this condition, and with point 125A fixed, all fixtures align accurately with their respective working units.

FIGURE 9 is generally similar to FIG. 8 except that the clearance 77A is no longer uniform around its circumference. The solid line portions of FIG. 9 show it completely eliminated (unrealistically because of lubricant) at one point of tangency to the stationary plate 73A. It is to be noted that the above described displacement of the table has been made using the fixed point 125A as a pivot. The dashed line portions show the table oppositely displaced to the extent of the clearance; the point 125A still being kept fixed.

FIGURE 9 clearly shows that the described displacements of the table destroy th eperfection of alignment of the arrow pairs such as 49A–7A, for example. This occurs despite the fact that the locating device at 125A remains perfectly fixed. Such table displacements inevitably occur because of lateral forces due to various agencies including forces due to cutting action of the tools, etc. Furthermore, the exact amounts of displacement are unpredictable and variable. As a result, the alignment error of working units to fixtures becomes randomly variable. This, of course, produces randomly variable errors in the machined dimensions from one work-piece to another. In the language of Kinematics, the combination of the table and its central locator is an "incompletely constrained element" which is inherently subject to random error.

Obviously, the variability shown in FIG. 9 is grossly exaggerated. Practically, years of experience show that; using a table of about forty-eight inches diameter and best quality craftsmanship throughout, the range of random variability is in the order of plus or minus three thousandths of an inch. In general, such variability has been tolerable in the great majority of cases. Where this is not acceptable, rather elaborate special devices have been provided to cause each unit to force its related fixture into alignment. The tendency of modern machinery is constantly toward closer tolerances nad a simple means to provide them is in demand.

Toward a solution

Figure 10:
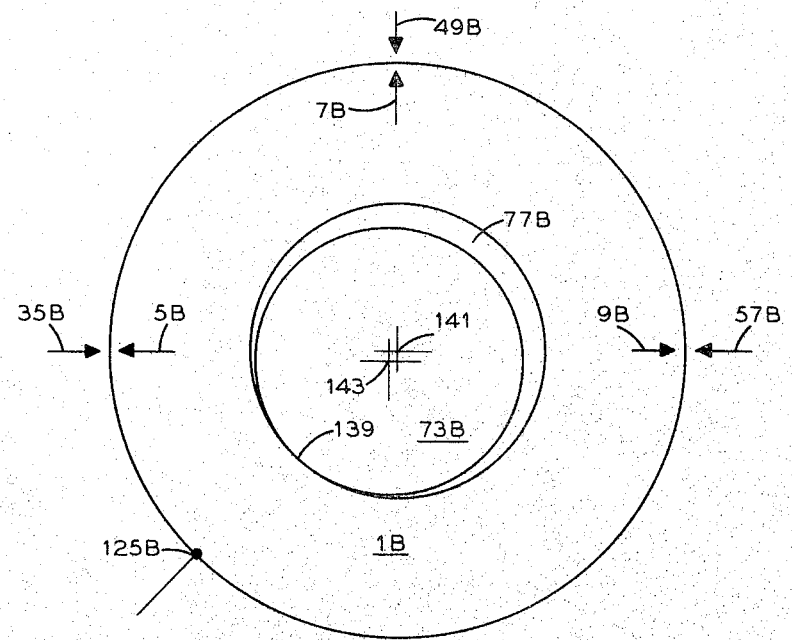

FIGURE 10 shows a somewhat different geometrical concept. This is not really a solution to the problems stated but it could possibly be used to give some improvement and it is a move which leads to the real solution to be described below.

In FIG. 10, the subscript B has been used corresponding to subscript A in FIGS. 8 and 9. In FIG. 10, numeral 125B still represents the fixed point created by the locating plunger of FIG. 1. However, in FIG. 10, this locator is not merely a device to prevent rotary motion of the table. In addition, the actuator 129 of FIG. 1 has been made forceful enough to produce actual displacement of the table in the direction of plunger 125. This displacement is such as substantially to destroy the clearance 77B at point of tangency 139.

Because of the intentional displacement just described, the center of table 1B occupies position 141 which is deliberately different from the center 143 of the plate 73B. The critical location arrows (such as 7B–49B, for example) are now adjusted for accurate location when the table center is at point 141 rather than 143. Using this arrangement, the center of rotation will be approximately at 143 when the table is in motion. However, when the table is stopped, the table center is presumed always to be at point 141 and all adjustments are made with the table center at 141.

The fallacy in this approach is the assumption that point 141 will always be repeated exactly when the plunger 125 is advanced. This is a fallacy because the point of tangency 139 cannot be depended upon to repeat. The said tangency is between two circles of almost identical radii. Only a small amount of friction can cause this point to shift substantially one way or the other. Kinematically the location of center 141 is determined by two points plus friction and the latter is an uncertainty. Thus, the constraint is not adequate.

The Invention

Figure 11:
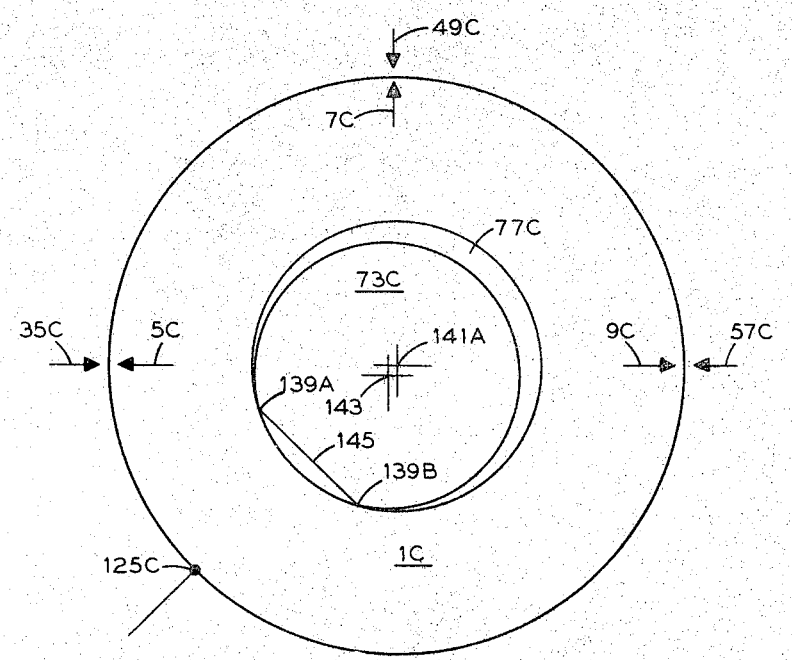

FIGURE 11 shows a simple but profoundly significant change from FIG. 10. In FIG. 11, the stationary bearing disc 73c has a portion of its periphery cut away as indicated at 145. The cut away portion 145 is shown as a cord of the bearing circle. This particular configuration is not essential. It is only important that the disc 73C be "relieved" or reduced in radius over a substantial arc of the bearing and that this relieved arc be bisected by the radial line of action of the plunger 125.

When force is now applied by the insertion of plunger 125, the clearance 77C is destroyed at two definite points (actually lines perpendicular to the drawing) 139A and 139B. The lines of contact represented by points 139A and 139B are relatively sharp intersections of surfaces and, as such, they cut through any lubricant present to make substantially metal-to-metal contact between the disc 73C and the mating inner bearing surface of table 1C.

Displacement of table 1C positions the center of the table at 141A very near to point 141 of FIG. 10. As described relative to FIG. 10, the critical alignments are made with the table center at 141A. This fact is indicated by the arrows such as 35C–5C; the new suffix C being used to indicate that their locations are not identical to those indicated in FIG. 10 by suffix B (since center 141A is different from center 141).

The significant difference from FIG. 10 to FIG. 11 is that center 141A in FIG. 11 is a geometrically and kinematically precise point. As explained before, point 141 in FIG. 10 is geometrically determined but kinematically uncertain.

Point 141A is precisely defined for the reason that it depends upon three noncolinear fixed points (lines) of contact. This meets the classical requirement for stability; that is, one and only one, restraint in each degree of freedom. Other recognized examples are: the tripod, a cylinder in a "V-block" with one additional point or line or contact; a sphereometer; a three-legged internal caliper, etc.

Practical results with the FIG. 11 construction have been to improve accuracy of repeatability by a factor of five to ten. The very first machine showed consistent repeatability of less than plus or minus one-thousandth and typical repeatability in the order of plus or minus three tenths of a thousandth. This is practically unheard of accuracy in machinery as large and rugged as that described.

What is claimed is:
1. A multi-station machine unit comprising a stationary bearing member of substantially circular cross-section arranged about a fixed axis, a work table concentric with and in bearing contact with said bearing member for rotation about the axis thereof, a plurality of fixtures mounted on and equally angularly spaced around the circumference of said work table, means for mounting a workpiece in each of said fixtures, a plurality of work stations positioned around the circumference of said work table and having an angular spacing coresponding to the angular spacing of said fixtures, means for rotating said table to locate a workpiece successively at each of said work stations, and means for circumferentially aligning said workpieces at corresponding work stations including a cutaway portion extending over a substantial part of the circumference of said bearing member and means constructed and arranged to lock said work table against rotary movement and to exert a radial thrust on said work table intersecting the cutaway portion of said bearing member and effecting contact between said work table and bearing member at the ends of said cutaway portion, whereby the position of the center of said work table can be reproducibly fixed.

2. A multi-station machine unit as claimed in claim 1 in which the means exerting a radial thrust on said work table are arranged to exert said force in a direction bisecting the cutaway portion of said bearing member.

3. A multi-station machine unit as claimed in claim 1 in which said bearing member is cut away along a chordal line.

4. A multi-station machine unit as claimed in claim 1 in which said bearing member is cut away along a chordal line and the means exerting a radial thrust on said work table are arranged to exert said force in a direction bisecting the cutaway portion of said bearing member.

5. A machine tool unit comprising a support member, a horizontally disposed table mounted for rotation on said support member, closely radially spaced upright cylindrical surfaces defining a running fit between said member and said table, the cylindrical surface of said support member being cut along a chord of said surface, means for mounting a plurality of workpieces equally angularly spaced about the circumference of said table, a plurality of working stations radially spaced adjacent the circumference of the table, the angularity between said stations being equal to the angularity between said workpieces, means for rotating said table to locate each of said workpieces successively at each of said working stations, indexing means on said table equally angularly spaced from each of said workpieces, and plunger means circumferentially fixed in position relative to said table and bisecting the chordal cut of said support member cylindrical surface, said plunger means being operable radially of said table to engage one of said indexing means circumferentially aligning a workpiece at each of said working stations and reproducibly positioning the vertical axis of said table.

6. A machine tool unit comprising a horizontally disposed table having a depending annular flange, said flange having its inner surface machined to a substantially true cylinder, a fixed member arranged to support said table for rotation about a vertical axis, said member having a cylindrical portion closely radially spaced from the inner surface of said depending flange, means forming two spaced points of contact between said cylindrical portion and the inner surface of said flange when said table is forced toward said fixed member, means for mounting a plurality of workpieces equally angularly spaced about the circumference of said table, a plurality of working stations radially spaced adjacent the circumference of the table, the angularity between said stations being equal to the angularity between said workpieces, means for rotating said table to locate each of said workpieces successively at each of said working stations, and indexing means for aligning said workpieces at said working stations including a plunger positioned adjacent the periphery of said table and operable radially of said table to bisect said spaced points of contact and to engage said indexing means and force said table against said spaced contact points.

7. A machine tool unit comprising a support member, a horizontally disposed table mounted for rotation on said support member, closely radially spaced radially spaced from the inner surface of said depending member and said table, the cylindrical surface of said support member being cut away along a chord of said surface, means for mounting a plurality of workpieces equally angularly spaced about the circumference of said table, a plurality of working stations radially spaced adjacent the circumference of the table, the angularity between said stations being equal to the angularity between said workpieces, means for rotating said table to successively locate a workpiece at each of said working stations, indexing means on said table equally angularly spaced from each of said workpieces, said indexing means having a first surface lying in a vertical plane substantially radial to said table and a second surface inclined with respect to said first surface and lying in a vertical plane intersecting said radial plane intermediate the central portion and the periphery of said table, and plunger means moveable in a direction radial to said table and having a wedge shaped end portion with one surface substantially radial with respect to said table and bisecting the chord of said support member for engaging one of said indexing means to accurately align a workpiece at each of said working stations.

No references cited.

RICHARD H. EANES, JR., *Primary Examiner.*

UNITED STATES PATENT OFFICE
CERTIFICATE OF CORRECTION

Patent No. 3,336,823                                      August 22, 1967

Stephen A. Bonzi

It is hereby certified that error appears in the above numbered patent requiring correction and that the said Letters Patent should read as corrected below.

Column 2, line 11, for "slight" read -- slightly --; line 33, for "coresponding" read -- corresponding --; column 5, line 74, for "hinderance" read -- hindrance --; column 8, line 63, for "nad" read -- and --; column 10, line 13, for "coresponding" read -- corresponding --; column 11, lines 14 to 16, strike out "radially spaced from the inner surface of said depending member" and insert instead -- cylindrical surfaces defining a running fit between said member --.

Signed and sealed this 15th day of October 1968.

(SEAL)

Attest:

Edward M. Fletcher, Jr.                                      EDWARD J. BRENNER

Attesting Officer                                                    Commissioner of Patents